(12) United States Patent
Belfiore et al.

(10) Patent No.: US 7,692,117 B2
(45) Date of Patent: *Apr. 6, 2010

(54) WIRE GRIPPER FOR A DRIVE UNIT OF A WIRE FEEDER

(75) Inventors: Brian J. Belfiore, Highland Heights, OH (US); Edward A. Enyedy, Eastlake, OH (US); Bryan Nelson, Chardon, OH (US)

(73) Assignee: Lincoln Global, Inc., Monterey Park, CA (US)

( * ) Notice: Subject to any disclaimer, the term of this patent is extended or adjusted under 35 U.S.C. 154(b) by 754 days.

This patent is subject to a terminal disclaimer.

(21) Appl. No.: 11/358,896

(22) Filed: Feb. 21, 2006

(65) Prior Publication Data

US 2006/0138114 A1 Jun. 29, 2006

Related U.S. Application Data

(63) Continuation of application No. 10/623,963, filed on Jul. 22, 2003, now Pat. No. 7,026,574.

(51) Int. Cl.
*B23K 9/12* (2006.01)
*B65H 20/00* (2006.01)

(52) U.S. Cl. .................. 219/137.7; 226/187

(58) Field of Classification Search ............ 219/137.2, 219/137.7; 226/90, 176, 177, 181, 187; 267/168
See application file for complete search history.

(56) References Cited

U.S. PATENT DOCUMENTS 1,640,368 A 8/1927 Obetz et al.

(Continued)

FOREIGN PATENT DOCUMENTS

EP 1 057 751 A1 12/2000

(Continued)

OTHER PUBLICATIONS

Miller Electric Mfg. Co., S-52A, S-54A Owner's Manual, Oct. 1991, 40 pgs., USA.

*Primary Examiner*—Kevin P Kerns
(74) *Attorney, Agent, or Firm*—Hahn Loeser & Parks LLP

(57) ABSTRACT

A gripping device is disclosed for a set of pinch rollers used in a wire feeder that supplies a welding operation with a consumable welding wire. The welding wire passes between the pinch rollers whereby the pinch rollers engage the wire with a gripping force and incrementally rotate to control the outflow of the wire to the welding operation. The gripping device has a first member which is displaceable relative to a second member and a spring mechanism extending between the first and second members which has at least a first and a second spring modulus. The spring mechanism produces the gripping force as the first and the second members are displaced toward one another. The gripper urges one roller of the set of pinch rollers toward the other roller of the set to engage the wire and to apply the gripping force. By including a spring with a first and second spring modulus, the gripper can apply a first range of gripping forces with the force produced by the first spring modulus and a second range of gripping forces with the force produced by the second spring modulus.

6 Claims, 5 Drawing Sheets

U.S. PATENT DOCUMENTS

| | | | |
|---|---|---|---|
| 2,271,723 | A | 2/1942 | Trainer |
| 2,286,140 | A | 6/1942 | Klein et al. |
| 2,525,590 | A | 10/1950 | Collins |
| 2,603,343 | A | 7/1952 | Payne |
| 2,754,958 | A | 7/1956 | Murrell et al. |
| 2,767,302 | A | 10/1956 | Brashear, Jr. |
| 2,778,910 | A | 1/1957 | Landis et al. |
| 2,786,674 | A | 3/1957 | Heijnis et al. |
| 2,906,913 | A | 9/1959 | Catlett |
| 2,929,496 | A | 3/1960 | Muehlebach et al. |
| 2,974,850 | A | 3/1961 | Mayer |
| 3,016,451 | A | 1/1962 | Cornell, Jr. |
| 3,052,393 | A | 9/1962 | McKenzie |
| 3,207,401 | A | 9/1965 | Everett |
| 3,217,136 | A | 11/1965 | Anderson |
| 3,239,120 | A | 3/1966 | Bosteels |
| 3,244,347 | A | 4/1966 | Jenk |
| 3,263,060 | A | 7/1966 | Bosteels |
| 3,401,859 | A | 9/1968 | Rienks et al. |
| 3,430,832 | A | 3/1969 | Meyer |
| 3,491,876 | A | 1/1970 | Zecchin |
| 3,553,423 | A | 1/1971 | Doxey |
| 3,562,577 | A | 2/1971 | Kensrue |
| 3,644,701 | A | 2/1972 | Kobayashi et al. |
| 3,694,620 | A | 9/1972 | Gleason |
| 3,722,772 | A | 3/1973 | Flowers et al. |
| 3,730,136 | A | 5/1973 | Okada |
| 3,883,061 | A | 5/1975 | Thor |
| 3,898,419 | A | 8/1975 | Smith |
| 4,098,445 | A | 7/1978 | Samokovliski et al. |
| 4,150,772 | A | 4/1979 | Auer |
| 4,205,771 | A | 6/1980 | Samokovliski et al. |
| 4,235,362 | A | 11/1980 | Hubenko |
| 4,247,751 | A | 1/1981 | Ashton et al. |
| 4,261,499 | A | 4/1981 | Samokovliski et al. |
| 4,268,248 | A | 5/1981 | Wilbur et al. |
| 4,277,011 | A | 7/1981 | Jeter |
| 4,354,626 | A | 10/1982 | Brandewie et al. |
| 4,426,046 | A | 1/1984 | Heuckroth |
| 4,508,954 | A | 4/1985 | Kroll |
| 4,532,406 | A | 7/1985 | Povlick |
| 4,582,198 | A | 4/1986 | Ditton |
| 4,623,063 | A | 11/1986 | Balkin |
| 4,659,904 | A | 4/1987 | Greineder |
| 4,665,300 | A | 5/1987 | Bellefleur |
| 4,731,518 | A | 3/1988 | Parmelee et al. |
| 4,842,669 | A | 6/1989 | Considine |
| 4,869,367 | A | 9/1989 | Kawasaki |
| 4,889,271 | A | 12/1989 | Kurokawa |
| 5,053,591 | A | 10/1991 | Theurer |
| 5,053,598 | A | 10/1991 | Sakai et al. |
| 5,060,882 | A | 10/1991 | Rousculp et al. |
| 5,072,872 | A | 12/1991 | Casset et al. |
| 5,078,269 | A | 1/1992 | Dekko et al. |
| 5,090,647 | A | 2/1992 | Clarke |
| 5,109,983 | A | 5/1992 | Malone et al. |
| 5,155,330 | A | 10/1992 | Fratiello et al. |
| 5,205,412 | A | 4/1993 | Krieg |
| 5,277,314 | A | 1/1994 | Cooper et al. |
| 5,309,603 | A | 5/1994 | Oexler et al. |
| 5,369,243 | A | 11/1994 | Kramer et al. |
| 5,410,126 | A | 4/1995 | Miller et al. |
| 5,489,056 | A | 2/1996 | Staschewski |
| 5,494,160 | A | 2/1996 | Gelmetti |
| 5,497,928 | A | 3/1996 | Burns et al. |
| 5,521,355 | A | 5/1996 | Lorentzen |
| 5,584,648 | A | 12/1996 | Camelli et al. |
| 5,622,637 | A | 4/1997 | Taiana |
| 5,775,619 | A | 7/1998 | Tabellini |
| 5,816,466 | A | 10/1998 | Seufer |
| 5,819,934 | A | 10/1998 | Cooper |
| 5,836,539 | A | 11/1998 | Grimm et al. |
| 5,845,862 | A | 12/1998 | Cipriani |
| 5,951,885 | A * | 9/1999 | Takahashi et al. ............. 219/83 |
| 5,973,291 | A | 10/1999 | Kramer et al. |
| 5,981,906 | A | 11/1999 | Parker |
| 6,213,375 | B1 | 4/2001 | Rybicki |
| 6,225,596 | B1 | 5/2001 | Chandler et al. |
| 6,228,213 | B1 | 5/2001 | Hanna et al. |
| 6,267,291 | B1 | 7/2001 | Blankenship et al. |
| 6,427,894 | B1 | 8/2002 | Blank et al. |
| 6,557,742 | B1 | 5/2003 | Bobezko et al. |
| 6,561,528 | B2 | 5/2003 | Bootsman |
| 6,568,578 | B1 * | 5/2003 | Kensrue ................. 219/137.7 |
| 6,596,970 | B2 | 7/2003 | Blankenship et al. |
| 6,596,972 | B1 | 7/2003 | DiNovo et al. |
| 6,627,848 | B2 | 9/2003 | Boehnlein |
| 6,892,810 | B2 | 5/2005 | Austbo et al. |
| 7,026,574 | B2 * | 4/2006 | Belfiore et al. ........... 219/137.7 |
| 2004/0188100 | A1 | 9/2004 | Austbo et al. |
| 2005/0224482 | A1 | 10/2005 | Matiash |
| 2005/0224484 | A1 | 10/2005 | Matiash |
| 2005/0224485 | A1 | 10/2005 | Matiash et al. |
| 2005/0224486 | A1 | 10/2005 | Matiash |
| 2005/0224488 | A1 | 10/2005 | Matiash |
| 2005/0224489 | A1 | 10/2005 | Matiash |
| 2005/0224550 | A1 | 10/2005 | Matiash |
| 2006/0070984 | A1 | 4/2006 | Barton et al. |

FOREIGN PATENT DOCUMENTS

| | | |
|---|---|---|
| JP | 62-111872 | 5/1987 |
| WO | 88/00488 | 12/1988 |
| WO | 94/00493 | 9/1994 |
| WO | 2005/099953 A1 | 10/2005 |

* cited by examiner

WIRE GRIPPER FOR A DRIVE UNIT OF A WIRE FEEDER

This application is a continuation of U.S. application Ser. No. 10/623,963 which was filed on Jul. 22, 2003 and is now U.S. Pat. No. 7,026,574.

This invention relates to the art of dispensing wire and, more particularly, to a wire gripper used in a drive unit of a wire feeder for controlling the force which is applied by the pinch rollers against the wire driven by the wire feeder.

INCORPORATION BY REFERENCE

The present invention relates to wire feeders which feed wire to a welding operation wherein the welding wire must be fed in a controlled manner without tangling or interruption. Wire feeders are known in the art and are generally shown and described in Seufer U.S. Pat. No. 5,816,466 which is hereby incorporated by reference herein as background information illustrating the general structure of a wire feeder including two sets of pinch rollers. Sakai U.S. Pat. No. 5,053,598 is incorporated herein as background information and illustrates the application of force on the welding wire by the pinch rollers to grip the wire. Hubenko U.S. Pat. No. 4,235,362; Gleason U.S. Pat. No. 3,694,620; and Okada U.S. Pat. No. 3,730,136 are also incorporated by reference herein as background information further illustrating wire feeding devices.

BACKGROUND OF THE INVENTION

The present invention is particularly applicable for use in connection with welding wire feeders and, therefore, the invention will be described with particular reference to wire feeders used in connection with a welding operation. However, the invention has broader applications and may be used with other types of wire or other wirelike materials.

It is, of course, well known that utilizing a welding wire as a consumable electrode in the welding process can enhance the weld. Furthermore, in order to maximize the appearance and strength of the weld, accurately controlling the feed of the welding wire is important. Another important aspect of utilizing a consumable welding wire is maintaining a consistent and reliable flow of wire to the welding operation. As can be appreciated, interruptions in the flow of the welding wire can stop the welding process thereby reducing its efficiency.

Another aspect of wire feeding relates to choosing the optimal welding wire for the particular welding process. In this respect, the type of metal to be welded and the desired strength properties of the welded joint, will dictate which welding wires should be utilized. As can be appreciated, different welding wires can have very different properties both metallurgically and physically. The primary concern in the invention of this application relates to the physical properties of the welding wire. There are several different types of welding wire including copper wire, steel wire and aluminum wire. Each of these wires have different physical characteristics which influence the drive unit of the wire feeder.

One such physical characteristic is the hardness of the wire which influences the pinch rollers ability to grip the wire and accurately control the feed rate of the welding wire. In view of the importance in maintaining a desired feed rate, the welding wire feeders known in the art include control systems to accurately control the rotation of the pinch rollers that drive the welding wire. But these control systems are effective only if the pinch rollers maintain a constant grip on the wire. More particularly, a set of pinch rollers are two opposing rollers having parallel but spaced roller axes. The rollers rotate in opposite directions about their respective axis such that the portions of the peripheral roller edges that face one another move in the same direction. The pinch rollers are moveable toward one another so the welding wire is sandwiched between both rollers. As the drive unit of the wire feeder rotates the set of pinch rollers, the engagement between the pinch rollers and the welding wire drives the wire in the desired feed direction. The feed rate of the wire corresponds to the surface speed of the peripheral edges of the pinch rollers. As can be appreciated, a wire feeder can include more than one set of pinch rollers as is shown in Seufer and one or all of the sets of pinch rollers can be drive rollers. It should also be appreciated that non-drive pinch rollers can be used to help direct the flow of welding wire.

Turning to roller grip, controlling the outflow of welding wire is a function of the accuracy of the step motor used to drive the pinch rollers and the slippage between the peripheral edges of the pinch rollers and the welding wire. As can be appreciated, if the pinch rollers move relative to the wire, namely, slide on the surface of the wire, the rotation of the pinch rollers is not fully translated into wire outflow. As a result, prior art welding wire feeders have utilized different peripheral surfaces on the pinch rollers to maintain accurate contact with the welding wire. These outer surfaces include knurling or even high friction materials on the surfaces of the rollers. But it is important that the contact between the pinch rollers and the welding wire does not damage the welding wire which can impact the wire outflow to the welding torch and the welding operation. In addition, it is also advantageous to utilize pinch rollers that have a long service life to minimize the repairs necessary to maintain a properly functioning wire feeder.

It has been found that pinch rollers can be used in connection with different types of welding wires. However, the different physical characteristics of the many types of welding wire require different application forces to be applied by the pinch rollers against the welding wire. More particularly, a soft wire such as a copper wire, requires a low amount of application force to obtain the desired contact between the welding wire and the pinch rollers. In contrast, a steel wire requires a much greater application force to prevent slippage between the welding wire and the pinch rollers. In fact, the application force necessary to accurately move a steel wire would likely damage a copper wire. Other types of welding wire typically require different application forces. As a result of the different physical characteristics of the many welding wires, prior art feeders are set-up to only work in connection with only a small range of welding wires. Changing from a copper welding wire to a steel welding wire requires modifications to the wire feeder that often requires professional assistance.

A force generating device is used to create an application force that is transferred to the pinch rollers by a force applicator. The force generators can utilize a spring to produce the desired application force within a given range. As the spring is deflected, the application force increases. As is known in the art, a spring has a spring modulus or spring rate wherein the spring modulus is the additional force necessary to deflect the spring an additional unit distance. As an example, a compression spring having a 100 pounds per inch spring modulus will be compressed ½ inch by a 50 pound weight. Similarly, a spring cylinder having a spring with a 100 pounds per inch modulus will produce 50 pounds of force if the spring is compressed ½ inch. In connection with wire feeders, the 50 pounds force is used to create the application force on the welding wire.

The adjustability of the application force is at least in part a function of the force generator's ability to controllably compress the cylinder spring. As can be appreciated, based on the spring modulus which is linear, controllably compressing the spring will control the application force of the pinch rollers. Therefore it is important to be able to accurately control the compression of the spring. As is known in the art, threaded engagement between two components of the cylinder can be used to compress the spring and therefore control the application force. The accuracy of this arrangement is influenced by the gauge of threads used in the threaded engagement along with the spring modulus. As will be appreciated, a fine thread will provide finer adjustment ability than a coarse thread. Furthermore, a coarse thread will increase the amount of hand force necessary to compress the spring. But, the coarse thread will allow quicker changes to the application force.

One of the problems with prior art force generating devices is that ease of use must be compromised to provide increased adjustability to the application force. One such compromise is the use of a coarse threads to allowing quicker adjustment to the application forces for different welding wires.

Another problem with prior art force generating devices is that major modifications are necessary in order to obtain the application force necessary to work in connection with a wide range of wire types and wire sizes. The basis for the modifications is that force generating spring can produce only a limited range of forces. The range of forces needed to work in connection with both soft and hard wires is great enough to necessitate an excessively large spring cylinder and a significant amount of adjustment to change the application force from a desired force for a soft wire to a desired force for a hard wire. As a result, prior art wire feeders can require professional attention to change from one type of welding wire to another type of welding wire by necessitating changes to the force generator cylinder.

Yet another problem with prior art welding wire feeders is that the necessary adjustability for a soft wire is much different than the necessary adjustability for a harder wire. In this respect, in order to fine tune the application force for a soft wire, the force generating device must be capable of small incremental changes. More particularly, while a 10 pound change in application force will have a recognizable influence on the engagement between the pinch rollers and a soft wire, a 10 pound change in a harder wire may have virtually no recognizable change. Therefore, it is desirable to have finer adjustment abilities for softer wires. But, fine adjustment abilities can be a disadvantage with harder wires. The fine adjustment can increase the time and effort necessary to make the adjustment. In view of the fact that the threads utilized in the generator to compress the cylinder spring cannot be easily changed, a cylinder designed for fine adjustment of a soft wire may not even work with a hard wire. Conversely, a cylinder designed to be used in connection with a hard wire may not have the sensitivity necessary to make the fine adjustments for use in connection with a soft wire. These types of problems necessitate physical changes to the design of the wire feeder to change from a soft wire to a hard wire.

SUMMARY OF THE INVENTION

In accordance with the present invention, provided is a wire gripper for use in connection with a drive unit of a welding wire feeder which includes a force generator that can be effectively used in connection with a force applicator for feeding a wide range of welding wire without modification to the physical structure of wire gripper. In this respect, a wire gripper in accordance with the present invention includes a force generator having a cylinder spring with at least two spring moduli. The two spring moduli of the cylinder spring are utilized in different portions of the stroke of the cylinder to provide at least two ranges of application force and to provide the desired degree of adjustability for the different ranges of forces.

A wire gripper according to one aspect of the present invention can utilize two separate cylinder springs such that in a first range of the cylinder's stroke, the cylinder engages only one spring to produce a first range of application force and then in a second range of the stroke, both springs are engaged to produce a second range of application forces. The result is that the spring cylinder according to the present invention can be compact and can work in connection with more than one type of welding wire without physical changes.

In accordance with another aspect of the present invention, the first and second springs can be coaxial to one another.

In accordance with yet another aspect of the present invention, the spring cylinder and springs are all cylindrical and the springs are compression springs.

In accordance with even another aspect of the invention, the spring cylinder can include a spring having more than one spring modulus wherein a single spring will have a different spring modulus at different portions of the cylinder's stroke. In this respect, the spring has a first spring portion with a first spring modulus and at least a second spring portion having a second spring modulus. In operation, the spring portion with the lesser spring modulus (the first spring portion), will deflect first producing a first range of forces. Subsequently, as the first spring portion reaches a set force, the second spring portion, with a higher spring modulus, will begin to deflect thereby producing a second range of forces.

In accordance with a further aspect of the invention, the spring cylinder can include a spring having a variable rate spring wherein the spring modulus changes throughout the stroke of the cylinder. As can be appreciated, a spring with a variable rate spring modulus results in a spring modulus which constantly changes as the spring is compressed.

The primary object of the present invention is the provision of wire gripper which allows a wire feeder to be used in connection with a wide range of welding wire without significant modification to the wire gripper.

Another object of the present invention is the provision of a wire gripper having a force generator or compression cylinder which allows the wire feeder to be used in connection with a wide range of welding wire without significant modification to the compression cylinder.

Yet another object is the provision of a wire gripper of the foregoing character that provides accurate adjustment to the application force for use with a wide range of welding wire.

Still another object is the provision of a wire gripper of the foregoing character that provides a wide range of adjustability even though it is compact in size.

Still yet another object is the provision of a wire gripper of the foregoing character which is easy to adjust for all types of welding wire.

A further object is the provision of a wire gripper of the foregoing character that can accurately adjust the application force in the pinch rollers for use with a wide range of welding wires.

Yet a further object is the provision of a wire gripper of the foregoing character that can be used in connection with existing welding wire feeder designs.

Even a further object is the provision of a wire gripper of the foregoing character which utilizes components that are economical to manufacture, easy to use in the field and have a long service life.

BRIEF DESCRIPTION OF THE DRAWINGS

The foregoing objects, and others, will in part be obvious and in part be pointed out more fully hereinafter in connection with a written description of preferred embodiments of the present invention illustrated in the accompanying drawings in which.

DESCRIPTION OF PREFERRED EMBODIMENTS

Figure 1:
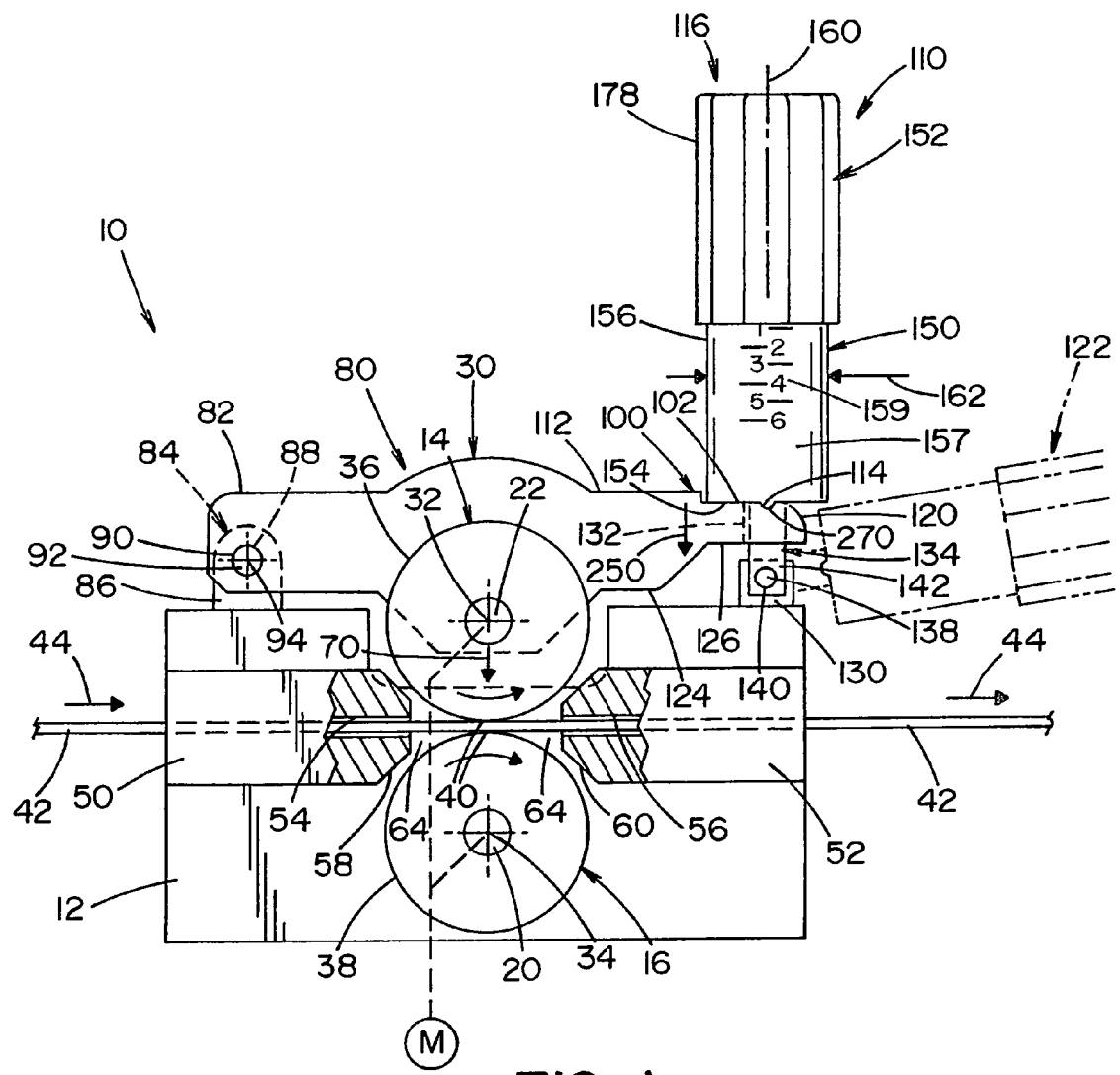
FIG. 1 is a partially sectioned elevational view of a drive unit including a wire gripper in accordance with the present invention having a lever arm, a set of pinch rollers and a compression cylinder.
Figure 2:
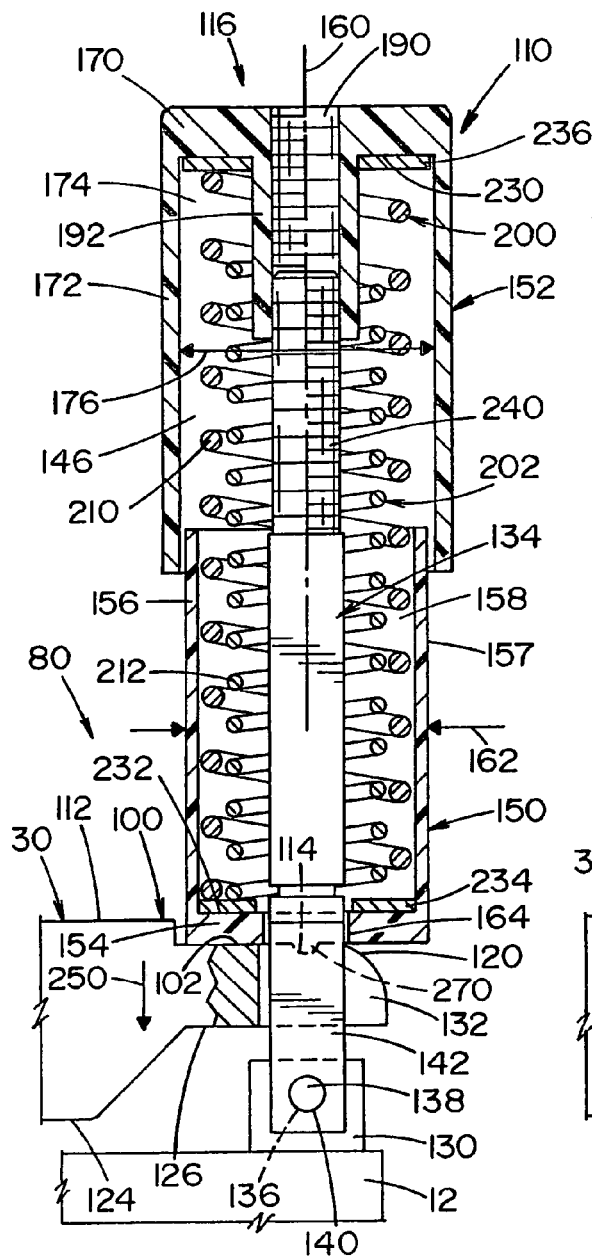
FIG. 2 is an enlarged sectional view of the compression cylinder shown in FIG. 1 wherein the cylinder is in a first range.
Figure 3:
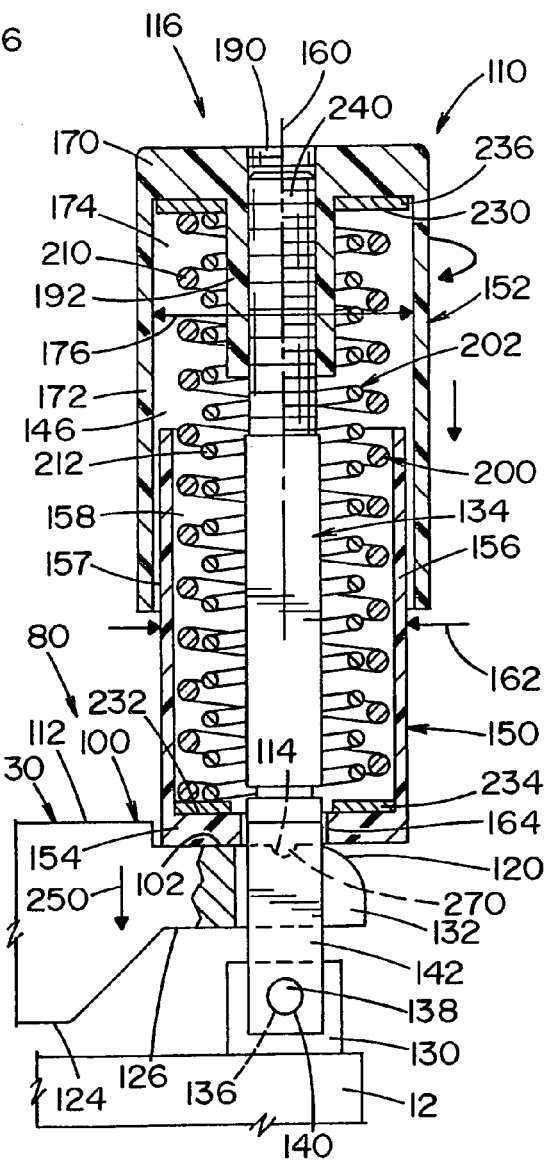
FIG. 3 is an enlarged sectional view of the compression cylinder shown in FIG. 1 wherein the cylinder is in a second range.
Figure 4:
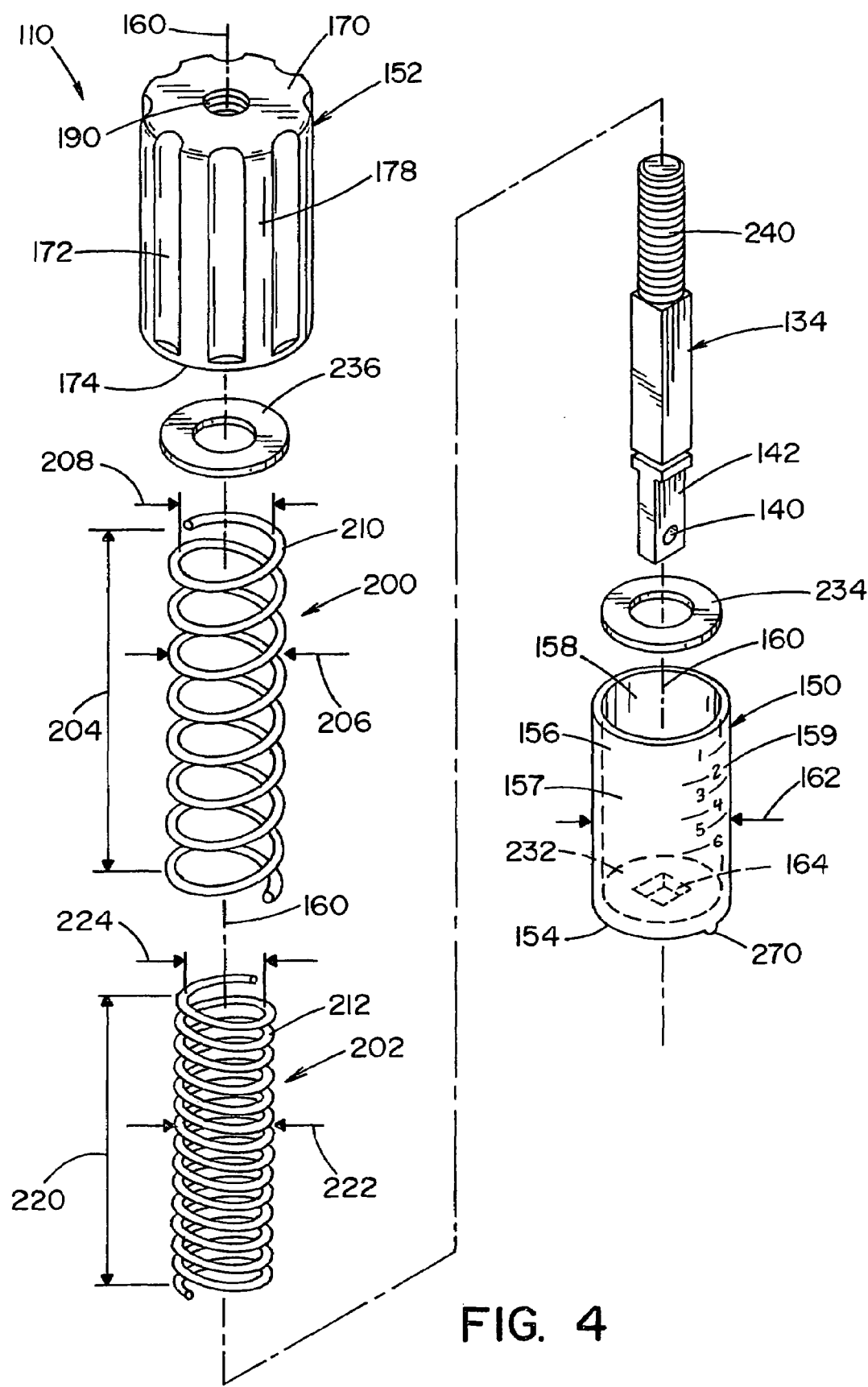
FIG. 4 is an exploded view of the compression cylinder shown in FIG. 1.

Referring now in greater detail to the drawings wherein the showings are for the purpose of illustrating preferred embodiments of the invention only, and not for the purpose of limiting the invention, FIGS. 1-4 show a drive unit 10 for a welding wire feeder (not shown). Drive unit 10 includes a support member 12 which is secured to the wire feeder and has a set of pinch rollers 14 and 16. Pinch rollers 14 and 16 are the drive rollers for the drive unit and are connected to an electric drive motor M which is known in the art and schematically shown. As is shown in Seufer, a gear box is used to connected the drive motor to the pinch rollers. It should be appreciated that other drive mechanisms could be used without detracting from the invention of this application. Furthermore, more than one set of drive rollers could also be used in accordance with the present invention.

Pinch roller 16 is a fixed roller which rotates about a fixed roller axle 20 thereby rotating about a fixed roller axis 34. Pinch roller 16 is secured to support member 12 such that fixed roller axis 34 is stationary relative to member 12. Conversely, pinch roller 14 is an adjustable roller that is attached to a lever arm 30 by roller axle 22. Pinch roller 14 rotates about a roller axis 32 which can be moved relative to support member 12 and fixed roller axis 34 which will be discussed in greater detail below.

The gear mechanism connected between drive motor M and the pinch rollers drives the rollers such that they rotate in opposite directions relative to one another. As is shown in FIG. 1, fixed roller 16 rotates clockwise while adjustable roller 14 rotates counterclockwise so that peripheral edges 36 and 38 of rollers 14 and 16, respectively, move in a common direction at contact point 40 with wire 42. As a result, pinch rollers 14 and 16 work in connection with one another to drive wire 42 in a feed direction 44. As can be appreciated, surface speeds of peripheral edges 36 and 38 should be the same as the desired wire speed of wire 42 to reduce nicking or other damage to the welding wire. In order to further minimize damage to wire 42, drive unit 10 includes wire guides 50 and 52 which direct both the inflow and the outflow of the wire through the drive unit. In this respect, wire guide 50 is the inlet guide for wire 42 having an inlet guide hole 54 that is a through hole having a diameter only slightly larger than the largest diameter of welding wire to be used. In similar fashion, wire guide 52 is an outflow guide for the welding wire having an outlet guide hole 56 sized similar to inlet guide hole 54. Inlet and outlet guides 50 and 52, respectively, further include tapered nose sections 58 and 60, respectively, facing one another which allow the wire guides to minimize free wire spaces 64, thereby minimizing the amount of wire which is not guided by the guide holes. As can be appreciated, the drive unit for the welding wire feeder is essentially pushing a flexible wire to the welding operation and, therefore, it is important that the flow of the wire is guided to prevent kinking or jamming of the welding wire in the outflow portions of the wire flow.

The outflow of welding wire is incrementally controlled based on the control of drive motor M. Step motors can be used to quickly start and stop the flow of welding wire as needed by the welding operation. The controls for the drive motor are controlled by the person or machine performing the welding operation. As can also be appreciated, the control of welding wire can be an important part of the welding operation and, therefore, it is important to control the flow of the welding wire. Slippage between the drive rollers and the welding wire reduces the incremental control of the flow of welding wire and, therefore, it is important to prevent wire slippage without damaging the welding wire.

An application force between 14 and 16 and wire 42 designated by the arrow 70, influences the likelihood of wire slippage. Application force 70 is produced by a wire gripper 80 which includes lever arm 30. In essence, wire gripper 80 moves adjustable roller 14 relative to fixed roller 16 such that adjustable roller 14 can be moved toward fixed roller 16 to engage welding wire 42 therebetween and can be moved sufficiently away from roller 16 to allow the replacement of the welding wire or to clear a jam in drive unit 10. This is accomplished by the pivotal engagement between lever arm 30 and support member 12. In this respect, lever arm 30 has a pivot end 82 that is pivotally connected to member 12 at a pivot joint 84. Pivot joint 84 can be any pivot joint known in the art and is shown as including a pivot mount 86 attached to member 12 by any known means in the art including welding, bolting or machining from the drive frame. Pivot mount 86 includes a through hole 88 and lever arm 30 includes a through hole 90. A pin 92 passes through holes 88 and 90 to allow lever arm 30 to freely rotate about lever pivot axis 94. In order to maintain the pivot pin in the proper position, pivot pin 92 can be press fit into one of the through holes 88 and 90 and can be slightly smaller than the other of the through holes 88 and 90. The pivot pin can also be a nut and bolt arrangement wherein the pivot pin is threadingly secured in position. As stated above, roller axle 32 is secured to lever arm 30 to allow pinch roller 14 to rotate relative to the lever arm. However, it should be noted that axle 32 can also be separate from lever arm 30 wherein lever arm 30 merely urges roller 14 toward roller 16 without detracting from the invention of this application. Roller axle 32 is positioned near the center of lever arm 30, but the axle can also be positioned at virtually any point spaced from the lever pivot point without detracting from the invention of this application.

Wire gripper 80 further includes a compression cylinder 110. In this respect, lever arm 30 has an outer end 100 with a ledge 102 shaped to receive compression cylinder 110. Ledge 102 is machined from a top edge 112 of lever arm 30 and is generally flat. Ledge 102 includes a locking groove 114 that works in connection with cylinder 110 to maintain cylinder 110 in a drive position 116 which will be discussed in greater detail below. Lever arm 30 further includes an edge ramp 120 at outer end 100 to help facilitate moving cylinder 110 from a released position 122 to a drive position 116 which will also be discussed in greater detail below. Lever arm 30 has a bottom edge 124 with a clearance notch 126 for a compression cylinder mount 130, and a cylinder post slot 132 for a cylinder post 134. Both cylinder mount and post 134 will be discussed in greater detail below.

Compression cylinder 110 is pivotally mounted on support member 12 by cylinder mount 130 which allows cylinder 110 to pivot between release position 122 and drive position 116. Cylinder mount 130 can be connected to member 12 in similar fashion as pivot mount 86. Cylinder mount 130 includes a through hole 136 and a pivot pin 138, and cylinder post 134 also includes a through hole 140 which receives pivot pin 138 to allow the pivotal movement of cylinder 110. As stated above, with respect to pivot mount 86, any pivotal mount known in the art could be used to allow for the pivotal movement of the compression cylinder.

Post 134 extends into an interior area 146 of cylinder 110 and can be used to hold the cylinder parts together. In greater detail, compression cylinder 110 includes a fixed slide cylinder 150 and a rotational cylinder 152 which is displaceable relative to fixed cylinder 150. However, it should be noted that cylinder 110 does not have to be cylindrical and that rotational cylinder 152 does not have to rotate relative to slide cylinder 150. They must merely move relative to one another, adjustably, to compress the cylinder spring(s) which will be discussed below. Slide cylinder 150 includes a base 154 and a cylindrical side wall 156 which extend upwardly from base 154 and produces a cylindrical pocket 158 forming a lower portion of interior area 146. While slide cylinder 150 is being described as having a cylindrical configuration, other configurations could be also used without detracting from the invention of this application. Cylindrical side wall 156 is coaxial with a cylinder axis 160 and has an outer diameter 162 transverse to cylinder axis 160. Base 154 includes a through hole 164 sized to allow the free passage of a lower portion 142 of cylinder post 134 relative to fixed cylinder 150. Side wall 156 has an outer surface 157 with graduations 159 to gauge the adjustment of compression cylinder 110. More particularly, as cylinder 152 is displaced toward cylinder 150, the bottom edge of cylinder 152 covers a portion of the graduations to indicate the level of adjustment.

Rotational cylinder 152 is also shown and described as being cylindrical. However, it should also be noted that other configurations could be used without detracting from the invention of this application. Cylinder 152 is a downwardly open cylinder and is sized slightly larger than slide cylinder 150 to allow telescoping movement between cylinders 150 and 152. Rotational cylinder 152 has a top 170 with cylindrical side wall 172 extending downwardly from top 170. Side wall 172 is also coaxial with cylinder axis 160 and forms a cylindrical pocket 174 open opposite to cylindrical pocket 158 and forming the upper portion of interior area 146. Cylindrical pocket 174 has an inside diameter 176 which is larger than outside diameter 162 of cylinder 150 to allow fixed cylinder side wall 156 to enter rotating cylinder pocket 174 for the telescoping movement. Rotational cylinder 152 can also include an outer surface 178 having a non-slip coating and/or an outer texture to increase the grip between the user's hand and the cylinder to allow the easy rotation of the cylinder with a minimal hand grip. This can include a rubberized outer surface and/or gripping ribs 178 or other means known in the art to promote a secure grip. Rotational cylinder 152 further includes an upper threaded opening 190 for threaded engagement with the threaded upper end of cylinder post 134 which will be discussed in greater detail below. In order to allow for an increased amount of adjustment, rotational cylinder 152 includes a threaded extension 192 extending downwardly from top 170. By including threaded extension 192, threaded opening 190 can extend well into upper pocket 174 without reducing the amount of the pocket which can be used in connection with a first cylinder spring 200 and second cylinder spring 202 which are discussed below.

First and second cylinder springs 200 and 202 are compression springs, wherein first compression spring has a first spring modulus and second compression spring has a second spring modulus. It should be noted that while compression springs are shown, other types of springs such as tension springs or leaf springs could be used without detracting from the invention. The first and second spring modulus can be the same modulus or they can be a different spring modulus. Nonetheless, even if the spring moduli are the same, the overall spring modulus will be different depending on whether one or both springs are compressed by the cylinder. In this respect, springs 200 and 202 are positioned in pockets 158 and 174 and are captured within the cylindrical pockets. This arrangement maintains the relative positions of the compression springs and also reduces the likelihood of contaminants entering into the spring mechanism which can affect the performance of the spring mechanism. Springs 200 and 202 extended about post 134. Spring 200 has a free or uncompressed height 204, an outer diameter 206, and an inner diameter 208 and is positioned within the cylinder pockets to be essentially coaxial with cylinder axis 160. Spring 200 is made from a first diameter spring wire 210. Second spring 202 has a free or uncompressed height 220, an outer diameter 222, an inner diameter 224, and is made from a second diameter spring wire 212 which is smaller than the diameter of wire 210. Second spring 202 is also essentially coaxial with cylinder axis 160. In this particular spring arrangement, first spring 200 is both longer and wider than second spring 202 and has a higher spring modulus. In this respect, height 204 is greater than height 220 and first spring inner diameter 208 is larger than second spring outer diameter 222 to allow second spring 202 to nest within first spring 200 and to allow both springs to freely compress based on the relative movement of rotational cylinder 152 to cylinder 150. Spring 200 has a larger spring modulus since it is made from a large diameter spring wire.

Since first spring 200 is longer than second spring 202, first spring 200 will be engaged and be compressed by relative displacement of cylinder 150 toward cylinder 152 before second spring 202 is engaged by cylinder 152. In this respect, rotating cylinder top 170 has a bottom surface 230 and fixed cylinder base 154 has a top surface 232. Fixed cylinder 150 further includes a lower washer 234 and rotating cylinder 152 includes an upper washer 236. Springs 200 and 202 rest on washer 234. As rotational cylinder 152 is threaded about an upper threaded portion 240 of post 134, rotational cylinder 152 causes the latter to be displaced toward slide cylinder 150. Due to first spring height 204 being greater than second spring height 220, upper washer 236 will first engage spring 200. As cylinder 152 is displaced further toward slide cylinder 150, first spring 200 will be compressed and will produce a cylinder spring force based on the compression of only first spring 200. However, as cylinder 152 continues to be rotated and advanced toward slide cylinder 150, upper washer 236 will eventually engage second spring 202 and begin to compress second spring 202 thereby changing the overall spring modulus to a function of the spring moduli of both the first and second springs.

Figure 5:
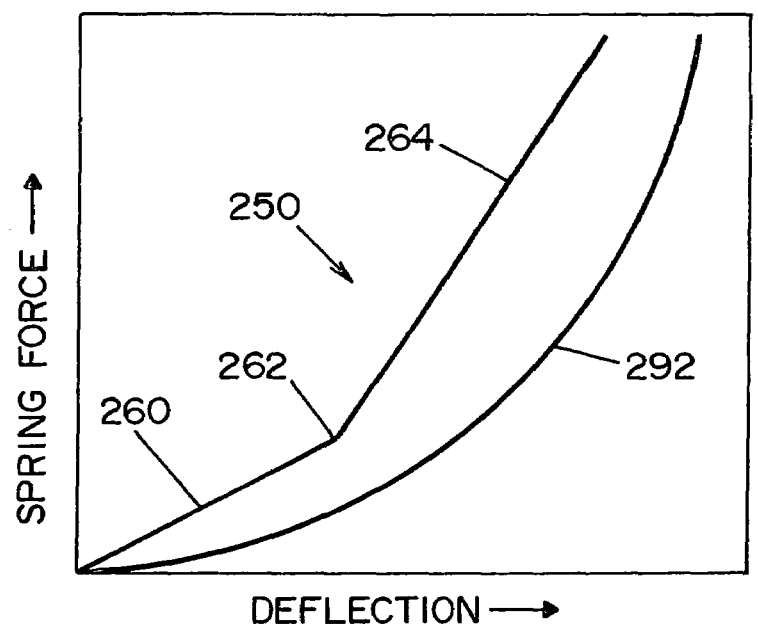
FIG. 5 is a schematic diagram showing overall spring force versus deflection.

FIG. 5 is a schematic representation of the changing overall cylinder force designated by the numeral 250. In this respect, when only the first spring 200 is compressed, the increase in overall spring force is shown by segment 260 which is linearly increasing at a fixed rate in relation to the deflection of the spring. The linear increase is a function of the spring modulus of spring 200. However, once second spring 202 is engaged, which is shown as point 262, the overall spring force will increase at a greater rate 264 for the same change in deflection. The linear increase in force in this range of deflection is a function of the spring modulus of spring 200 and the spring modulus of spring 202. As a result, first spring 200 can be configured for the range of forces needed for a softer wire and can allow for a more fine tuned adjustment necessary for the softer wire. In the event that the user of the wire feeder chooses to change to a harder wire, the gripper can be quickly adjusted so that second spring 202 is engaged thereby producing the second range of forces at a second level of adjustment necessary for the harder wire. Furthermore, the accuracy needed for adjusting the harder wire can be easily obtained without necessitating many rotations of cylinder 152.

The cylinder force is transmitted by wire gripper 80 to the pinch rollers 14 and 16 by way of lever arm 30 thereby producing the application force. In this respect, at any one adjustment wherein at least one spring is compressed, rotational cylinder 152 is positionally maintained relative to frame 12 by cylinder post 134 and cylinder mount 130. As a result, slide cylinder 150 is urged downwardly against ledge 102 of lever arm 30. This downward movement of slide cylinder 150 moves roller 14 towards fixed roller 16 until the pinch rollers engage wire 42. The spring force of the cylinder then provides the necessary application force for the pinch roller. As rotational cylinder 152 continues to be advanced toward slide cylinder 150, the force applied to the end of lever arm 130 is increased thereby increasing the application force between the pinch rollers and the wire.

The spring force produced by spring 200 or springs 200 and 202 also maintain cylinder 110 in drive position 116. In this respect, slide cylinder 150 further includes a locking ridge 270 which matingly engages with locking groove 114. The downward force produced by the spring(s) maintains the locking ridge within the locking groove. As can be appreciated, slide cylinder 150 would have to move upwardly against the force of the spring(s) to disengage from the locking groove. This connection effectively maintains the compression cylinder in the drive position while allowing the user to easily disengage the cylinder and move it to release position 122 if a jam is detected or if new wire is needed. In order to facilitate the re-engagement of the cylinder in the drive position, edge ramp 120 guides locking ridge 270 as it moves onto ledge 102 were it can be easily positioned in locking groove 114. Moreover, ramp 120 gradually displaces cylinder 150 relative to cylinder 152 to compress the spring(s), if they are engaged, as slide cylinder 150 moves toward rotational cylinder 152. Once ridge 270 is oriented over groove 114, the force of the spring(s) will move the ridge into locking engagement with the groove.

Figure 6:
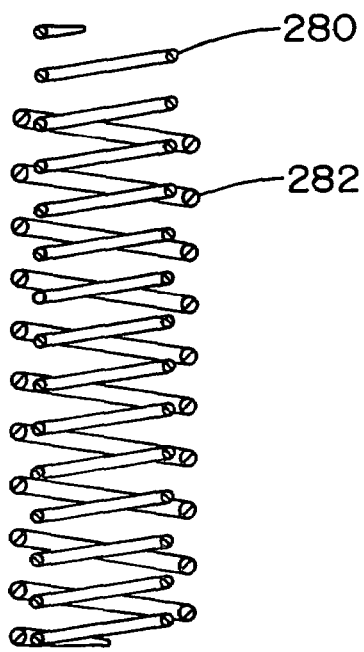
FIG. 6 is a sectional view of another embodiment of a set of compression springs for the compression cylinder shown in FIG. 1.
Figure 7:
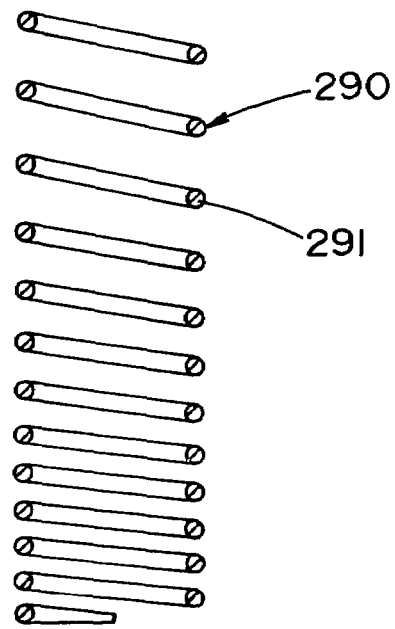
FIG. 7 is a sectional view of yet another embodiment in which the compression spring is a single spring having more than one spring modulus; and, FIG. 8 is a sectional view of even yet another embodiment wherein a single compression spring is used utilizing a variable rate spring.
Figure 8:
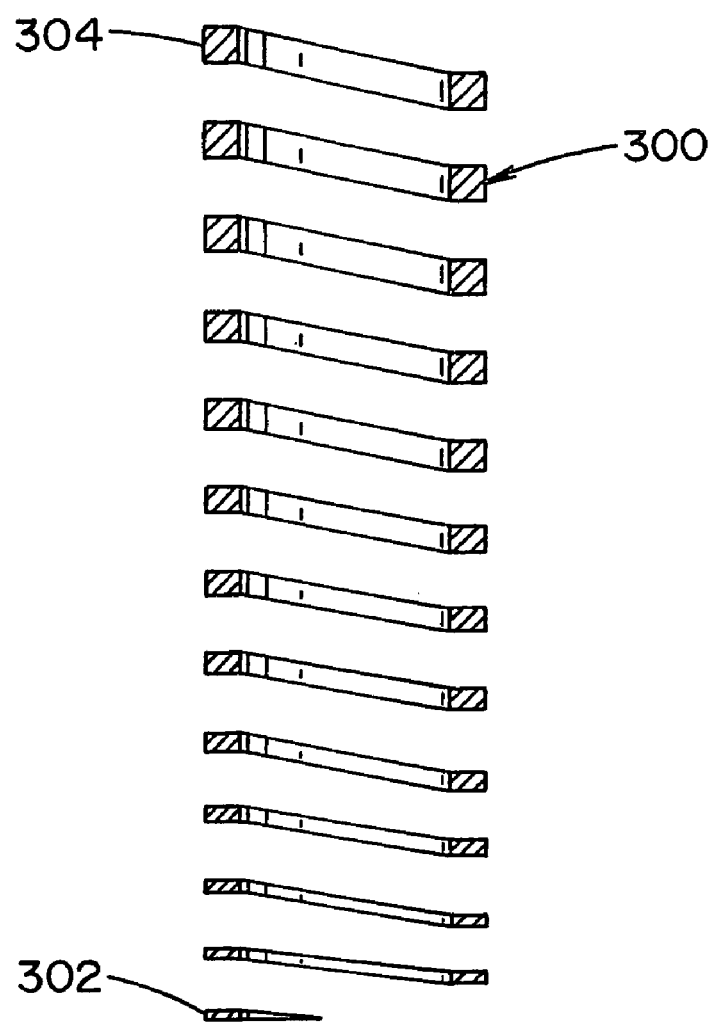

Referring to FIGS. 6-8, three additional embodiments are shown. As stated above, different combinations of springs can be used to obtain the multiple ranges of adjustment discussed above. The discussion above included spring 200 having a higher spring modulus than spring 202 and also being the first spring to be engaged by cylinder 152. With particular reference to FIG. 6, springs 280 and 282 are shown wherein spring 280 is the first spring to engage while spring 282 is the secondary spring. In contrast to springs 200 and 202, the first spring to engage, spring 280, has a spring modulus which is less than the spring modulus of second spring 282 to be engaged. This is at least in part because spring 282 is made from a larger diameter spring wire. This spring arrangement provides different ranges of adjustment which are not as closely spaced to one another as the spring arrangement shown with springs 200 and 202. While springs 200 and 202, and springs 280 and 282 are both shown to be nested springs, the springs could be stacked on top of one another. In a stacked spring arrangement, even though both springs would be engaged at essentially the same time, the spring with the smallest spring modulus would deflect first thereby producing the first range of application forces. Once the application force reaches a level great enough to deflect the larger modulus spring, the second spring would begin to deflect thereby producing the second range of application forces Referring to FIG. 7, a spring 290 is shown which has more than one spring modulus. As a result, a single spring can be used to produce multiple ranges of adjustment as discussed above. In this respect, the spring modulus of a compression spring is a function of the material used to make the spring, the size of the material used, and the number of turns per unit of length measured. While spring 290 is shown to be a compression spring with a round spring wire 291 having a constant wire diameter throughout the spring, the number of turns per unit of length changes along the length of the spring. As a result, the spring modulus will vary based on spacing between the turns in the spring. Spring 290 can be either multiple modulus spring or a variable modulus spring depending on the spacing of the turns. For example, if a first spacing is used in a first segment of the spring and a second spacing is used on the remainder of the spring, the spring will essentially have two spring moduli. Spring 290 is shown to be a variable rate spring. With particular reference to FIG. 5, segment 292 shows the non-linear or variable rate nature of spring 290. While spring 290 does not produce two clear and distinct adjustment ranges, it does allow for the fine tuned and precise adjustment needed for the soft wires while still providing for the large application force needed for the harder wires without requiring significant adjustment of the compression cylinder.

Referring to FIG. 8, a spring 300 is shown which is also a variable rate spring. However, spring 300 utilizes a change in material thickness to achieve the changing spring modulus for the spring. In this respect, the base 302 of spring 300 has a rectangular cross-sectional configuration which is much smaller in area than top 304 which is square. As a result, as spring 300 is compressed, the turns toward the bottom of the spring will more easily compress than the turns at the top of the spring. This will produce the change in spring modulus as is shown by segment 292 in FIG. 5.

It should be appreciated that other combinations of springs could be used to achieve two or more ranges of adjustment for the application force without requiring modification to the wire feeder.

While considerable emphasis has been placed on the preferred embodiments of the invention illustrated and described herein, it will be appreciated that other embodiments can be made and that many changes can be made in the preferred embodiment without departing from the principles of the invention. Accordingly, it is to be distinctly understood that the foregoing descriptive matter is to be interpreted merely as illustrative of the invention and not as a limitation.

Having thus described the invention, it is so claimed:

1. A force producing device for generating a gripping force between at least a first and a second roller, said first roller and said second roller capable of maintaining a substantially fixed displacement therebetween set by a wire therebetween, and wherein at least one of said rollers is capable of being driven by a drive unit of a wire feeder, said force producing device comprising: a biasing member adapted to generate a continuous range of selectable gripping forces on the wire between said rollers from a minimum force to a maximum force while said substantially fixed displacement is maintained therebetween; wherein a ratio of the gripping force to deflection of said biasing member is non-linear between said minimum force and said maximum force.

2. The wire gripping device of claim 1, wherein said ratio includes a first ratio and a second ratio that is unequal to said first ratio.

3. The wire gripping device of claim 1, wherein said gripping force is continuously adjustable between said minimum force and said maximum force.

4. The wire gripping device of claim 1, wherein, at said set displacement between said rollers, said gripping force is selectable throughout said continuous range of said selectable gripping forces from said minimum force to said maximum force.

5. The wire gripping device of claim 1, wherein said continuous range of selectable gripping forces includes a first range having a first slope and a second range having a second slope, and wherein, at said set displacement between said rollers, said gripping force is selectable over said first range.

6. The wire gripping device of claim 1, wherein said ratio of the gripping force to deflection of the biasing member is continuously non-linear between said minimum force and said maximum force.

* * * * *